(12) United States Patent
Robertson, II et al.

(10) Patent No.: US 12,376,190 B2
(45) Date of Patent: *Jul. 29, 2025

(54) SYSTEM FOR EMERGENCY RESPONSE ALERTS AND NOTIFICATION

(71) Applicants: George William Robertson, II, Lebanon, TN (US); William Parker Robertson, Lebanon, TN (US)

(72) Inventors: George William Robertson, II, Lebanon, TN (US); William Parker Robertson, Lebanon, TN (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/106,517

(22) Filed: Feb. 7, 2023

(65) Prior Publication Data

US 2023/0262841 A1    Aug. 17, 2023

Related U.S. Application Data

(63) Continuation of application No. 17/144,631, filed on Jan. 8, 2021, now Pat. No. 11,576,229.

(60) Provisional application No. 62/974,989, filed on Jan. 8, 2020.

(51) Int. Cl.
| | |
|---|---|
| *H04W 76/50* | (2018.01) |
| *H04W 4/02* | (2018.01) |
| *H04W 4/021* | (2018.01) |
| *H04W 4/12* | (2009.01) |
| *H04W 4/90* | (2018.01) |

(52) U.S. Cl.
CPC .......... *H04W 76/50* (2018.02); *H04W 4/021* (2013.01); *H04W 4/023* (2013.01); *H04W 4/025* (2013.01); *H04W 4/12* (2013.01); *H04W 4/90* (2018.02)

(58) Field of Classification Search
CPC ..... H04W 4/021; H04W 4/023; H04W 4/025; H04W 4/029; H04W 4/12; H04W 4/22; H04W 4/90; H04W 76/50; H04M 11/04; H04M 2242/04; H04M 1/72536
USPC .......................................................... 370/329
See application file for complete search history.

(56) References Cited

U.S. PATENT DOCUMENTS

| | | | | |
|---|---|---|---|---|
| 7,542,721 | B1 * | 6/2009 | Bonner ................. | G08B 29/16 |
| | | | | 455/445 |
| 2007/0030144 | A1 * | 2/2007 | Titus .................... | G08B 25/006 |
| | | | | 340/506 |
| 2008/0299940 | A1 * | 12/2008 | Shaffer ................. | H04L 65/403 |
| | | | | 455/518 |
| 2014/0313031 | A1 * | 10/2014 | Gupta .................... | G07C 1/20 |
| | | | | 340/539.13 |
| 2015/0024702 | A1 * | 1/2015 | Morgan ................ | H04M 11/04 |
| | | | | 455/404.1 |
| 2019/0380020 | A1 * | 12/2019 | Pellegrini ........... | G08B 25/016 |

(Continued)

*Primary Examiner* — Jean A Gelin
(74) *Attorney, Agent, or Firm* — Wayne Edward Ramage; Baker Donelson (57) ABSTRACT

A real-time application-based cellular system and method with real-time GPS positioning to notify civilian drivers of the proximity of emergency services vehicles in sufficient time to allow appropriate response. Civilian users receive alerts and information on their personal computing devices, including, but not limited to, tablets and smart phones. No addition or special hardware is required. Only drivers in a moving vehicle with a certain proximity are directly and selectively notified. The system also is able to send other additional customized warning signals to citizens in threatening situations in a non-vehicular context.

7 Claims, 8 Drawing Sheets

(56) References Cited

U.S. PATENT DOCUMENTS

2020/0029194 A1\* 1/2020 Speaker ............... H04W 4/027
2021/0289334 A1\* 9/2021 Martin .................... H04W 4/38

\* cited by examiner

SYSTEM FOR EMERGENCY RESPONSE ALERTS AND NOTIFICATION

This application is a continuation of U.S. application Ser. No. 17/144,631, filed Jan. 8, 2021, which claims benefit of and priority to U.S. Provisional App. No. 62/974,989, filed Jan. 8, 2020, by George William Robertson, II and William Parker Robertson. U.S. Provisional App. No. 62/974,989 and U.S. application Ser. No. 17/144,631 are incorporated herein in their entireties by specific reference for all purposes.

FIELD OF INVENTION

This invention relates to a system and methods for creating and providing emergency response alerts and notifications in real time to drivers and individuals based upon their location and other related factors.

BACKGROUND OF INVENTION

Historically, emergency services (ES) personnel and vehicles, including, but not limited to, police cars, ambulances, and firetrucks, have had at least an adequate ability to notify other vehicles of their approach during emergency situations, such as by lights and/or sirens or horns. This type of notifications is adequate when the roads were less crowded, most civilian vehicles were driving more slowly, and the civilian vehicles themselves were less enclosed with no substantial competing internal sound systems and were not engineered for sound dampening.

More recently, roads have gotten more crowded, speeds have increased, vehicles have become substantially soundproofed, and drivers are listening to other competing sounds sources (e.g., high definition stereo music). Improvements on the ES vehicles have been brighter LED lights and increased decibels of sirens, but these have not overcome the above issues.

The prior art has proposed various solutions, but these generally require cumbersome, additional hardware be added to vehicles or to specific locations, such as road intersections, and have not been implemented successfully. Prior art systems include U.S. Pat. No. 4,075,624 (electronic siren with variation in pitch), U.S. Pat. No. 5,497,148 (requires use of radar detectors), U.S. Pat. No. 7,099,776 (requires installation of specific hardware), U.S. Pat. No. 7,236,101 (emergency vehicle alert system required dedicated digital UHF transmitter and receiver units), U.S. Pat. No. 9,254,781 (emergency vehicle device providing alert at upcoming intersection), U.S. Pat. No. 10,147,318 (emergency vehicle system with transponder and receiver); US Pat App. No. 20040233067 (acoustic siren detector that captures outside audible high-pitched siren sound), and US Pat. App. No. 20110187559 (receivers installed at specific intersections to alert pedestrians); all of which are incorporated herein by specific reference for all purposes. Among other issues, the average citizen does not want to obtain and mount a new device in his or her vehicle.

Accordingly, there is a need for an improved system to provide notifications, alerts and information from first responders and other ES personnel during an emergency event to civilian drivers and other individuals that overcomes the issues discussed above.

SUMMARY OF INVENTION

In various exemplary embodiments, this invention comprises a computer-based system and application for creating and providing emergency response notifications in real time to drivers and individuals based upon their location and related factors. The system receives alerts and related emergency response information from a first responder using a computing device, including, but not limited to, a mobile computing device such as a tablet or smart phone, and then automatically creates and transmits alerts and related emergency response messages and information to a selected set of civilian users (i.e., non-emergency response personnel) through each users' computing device, including, but not limited to, a mobile computing device such as a tablet or smart phone.

DETAILED DESCRIPTION OF EXEMPLARY EMBODIMENTS

In various exemplary embodiments, the present invention comprises a computer-based system and application for creating and providing emergency response notifications in real time to drivers and individuals based upon their location and related factors. The system receives alerts and related emergency response information from a first responder using a computing device, including, but not limited to, a mobile computing device such as a tablet or smart phone, and then automatically creates and transmits alerts and related emergency response messages and information to a selected set of civilian users (i.e., non-emergency response personnel) through each users computing device, including, but not limited to, a mobile computing device such as a tablet or smart phone. The system comprises one or more computer servers operating on a network, such as, but not limited to, the Internet, and in electronic communication with multiple users through a client program or application running on various user computing devices, including, but not limited to, a personal computer, laptop, smart phone, tablet, or mobile computing device. The client applications and used to create alerts, transmit and receive data from the servers, and display data and related communications. The server or servers are responsible for processing all of the data, creating any automatic messages, and receiving and communicating with the various users.

Client applications are designed for and run on the appropriate operating system for user mobile devices (e.g., iOS or Android). The client applications are responsible for authorizing and authenticating users as well as communicating with the server API. One or more databases also are in electronic communication with the main system server or servers. The database contains various data about member users, as detailed below.

The user or client applications may be available for download and installation through the typical app stores available through computing devices or online, and may be installed and implemented on any cellular or Internet-enabled computing device, or otherwise capable of wireless communications. The civilian client application in some embodiments has a security/priority level sufficient to bypass the inactivation signal that some cellular smart phones or other devices initiate when the user is in motion (i.e., driving).

Figure 1:
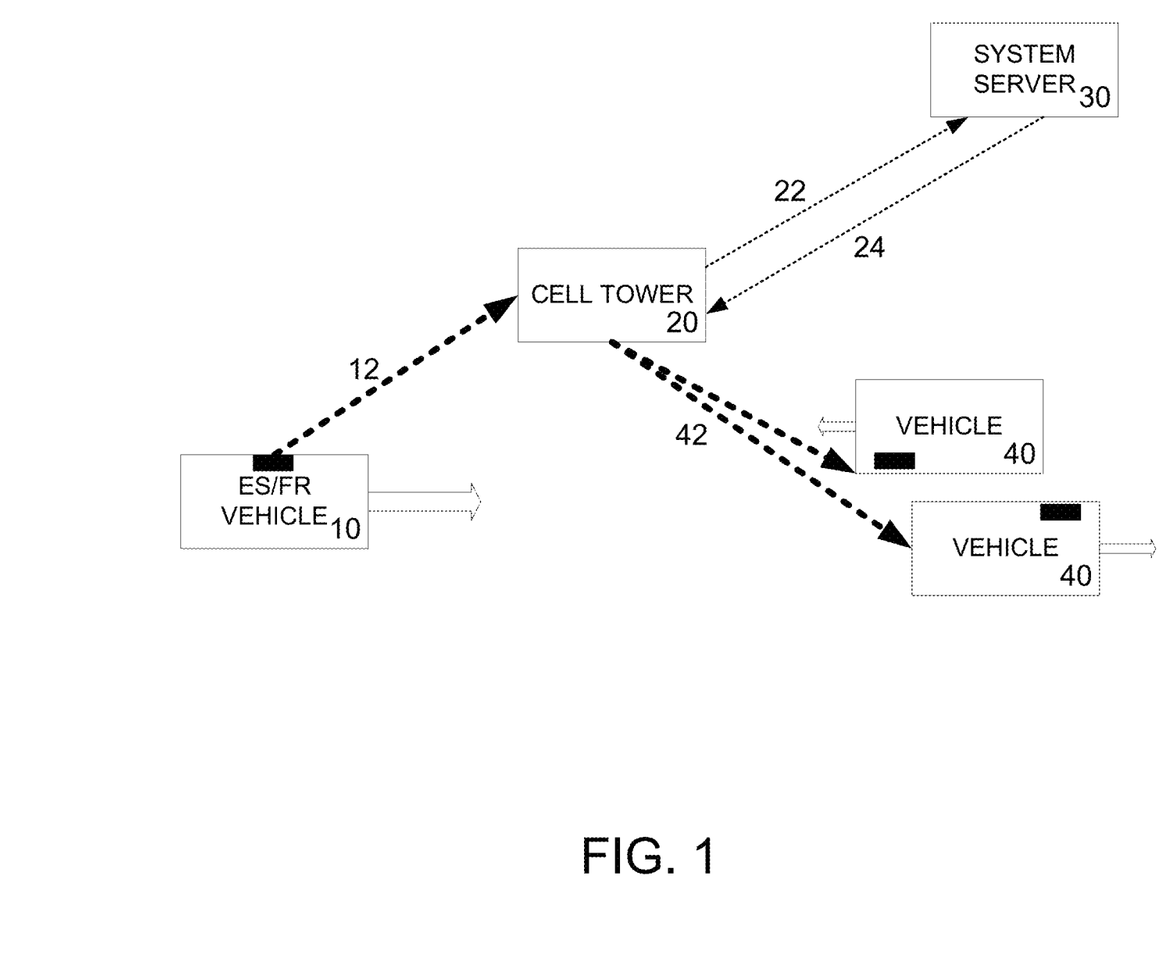
FIG. 1 is a diagram of a system providing a moving ES vehicle alert in accordance with an exemplary embodiment of the present invention.

FIG. 1 shows an exemplary embodiment of the present invention. In several exemplary embodiments, all ES or First Responder (FR) vehicles 10 in the system are equipped with a transmitting GPS-cellular unit, which uses cellular or wireless communications and networks (e.g., GSM, CDMA, LTE, 5G, or the like). The ES unit sends an "always on" signal 12 via a local cellular tower 20 to the system servers 30 when activated during emergencies by ES personnel. This is in addition to the vehicle's normal lights and sirens. The system then tracks in real-time the location of the ES/FR vehicle 10. The transmitting GPS-cellular unit in one configuration requires no additional storage, lights, cameras, apps, or other functions, and thus can be small in size. This allows the transmitting unit to be smaller than other transmitting units known in the prior art. In some embodiments, the GPS-cellular unit is handheld for easy transportation by the ES personnel from vehicle to vehicle, if desired. The signal also may be a radio signal sent directly to a receiving unit (such as a unit in a civilian vehicle).

The "always on" alert signal 12 is received by local towers 20 or a cellular-satellite device of one or more cellular carrier, and then transmitted 22 via network, such as the Internet, to one or more computer servers 30 for the system. The system server(s) 30 processes the GPS location data for the ES/FR vehicle in real time, and in real time, determines a subset of civilian users 40 to which to send information or signals 24, 42 regarding the alert signal and emergency event. The civilian users 40 use a civilian application program in accordance with the present invention on corresponding civilian computing devices. Basic user data is stored in the database, and the system uses this information to obtain and determine the real-time GPS location and movement of the users and user computing devices. For example, if a user in in motion at greater than 5 mph (or some other speed threshold), and is within a pre-determined distance (e.g., 0.1 mile, 0.2 mile, 0.25 mile, 0.5 mile, 1.0 mile, or other distance) of the traveling ES vehicle, their mobile device application would receive an alert notification. If a user within the pre-determined distance is moving more slowly or is stationary, no alert notification would be sent (as the user presumably would not be in a moving vehicle).

Various other criteria for determining a subset of user civilian users 40 may be used, separately or in combination. Several such criteria are discussed herein, but other selection or determination criteria are contemplated.

Further, some or all of the determination as to whether to display an alert, notification, or message to a particular user may be made at various levels in the system. As described above, for example, the determination can be made at the server level, wherein the emergency information is not sent to all users, but a smaller sub-set of the users. Alternatively, the emergency information could be sent to all users, and then the user device application makes a determination based upon locally-stored information (such as recent GPS movement history, or current location) to determine whether to display some or all of the information (in the form of an alert, notification, or message) on the user device for the user. In several embodiments, a combination may be used: the system server may send the emergency information to all users in a specific geographic location based upon the real-time location of the ES vehicle, thereby limiting the amount of data being sent by the system, and then the user application on the user device makes a further determination based upon locally-stored information as to whether to display some or all of the information. Or, alternatively, the system may send the message only to specific cellular towers (or similar cellular transmission devices), such as the first tower through which the ES message was received, and/or towers with a certain distance of the first tower or proximate or adjacent to the first tower in the network. This includes towers in other cellular networks as well.

The receiving user (e.g., someone driving nearby the location of the ES vehicle) receives the alert, which may be audible and/or visual, on their computing device (e.g., smartphone) from the system. This allows time for the civilian user to take appropriate measures, such as slowing down, pulling over, and the like. For example, an ES vehicle travelling at 80-90 mph typically can only offer a few seconds of audible warning in today's soundproofed vehicles, if they are heard at all. The present invention effectively offers that warning 10 to 20 times earlier to all potentially affected traffic, with an audible and/or visual signal to the driver inside the vehicle and thus bypassing the vehicle's sound-proofing. This helps save thousands of lives, millions of dollars in injury claims, and billions of dollars in overall damages (with the secondary effect of decreasing insurance rates), while keeping dedicated ES personnel safer and able to do their jobs with less interruption.

In several embodiments, the ES transmitting unit further comprises one or more of a microphone or audio receiver to accept voice-to-text recognition, a keyboard or keypad to accept manual entry of text, and a simple display screen or feedback feature to permit the ES provider to see and review the exact message that is about to be transmitted (as described below). This message would be transmitted along with the alert signal discussed above. The ES first responder would create a text and/or audio message with specific information and instructions that would help explain the situation or provide more information and helpful instructions to civilians, such as the direct, speed, and type of the approaching ES vehicle, and/or information about the emergency situation.

In some embodiments, the system itself may automatically create a text and/or audio message that is transmitted along with the alert signal based on information obtained from the ES vehicle and/or first responder.

Figure 2:
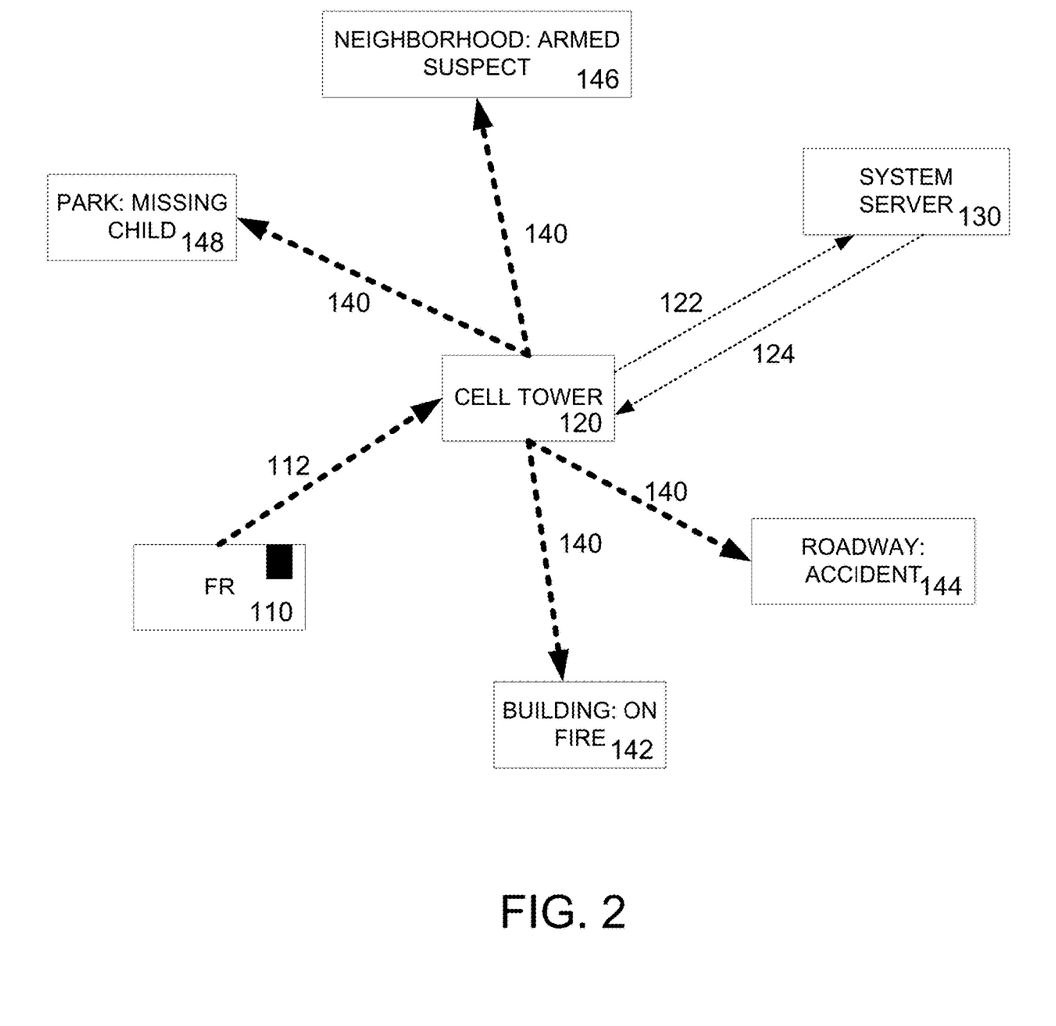
FIG. 2 is a diagram of a system providing various emergency event alerts and instructions in accordance with another exemplary embodiment of the present invention.
Figure 3:
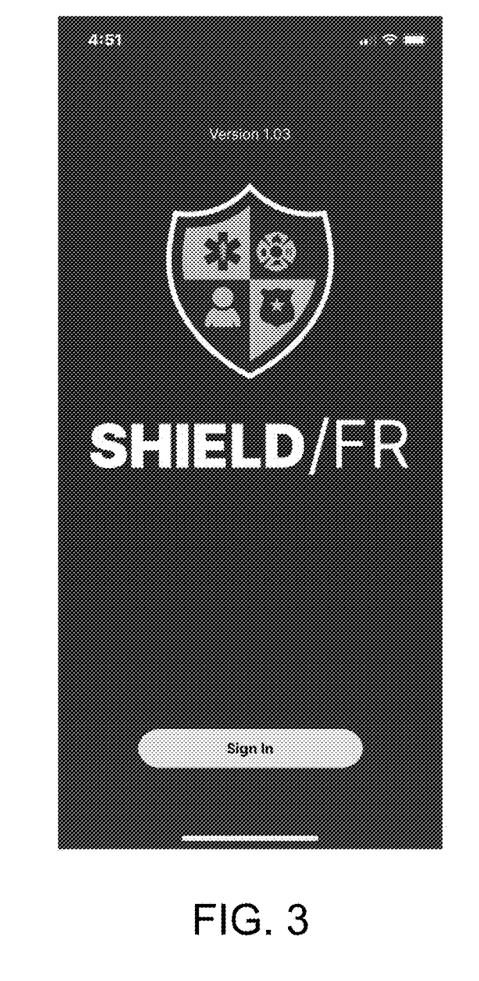
FIG. 3 shows an example of a start screen for a first responder user application in accordance with an exemplary embodiment of the present invention.
Figure 4:
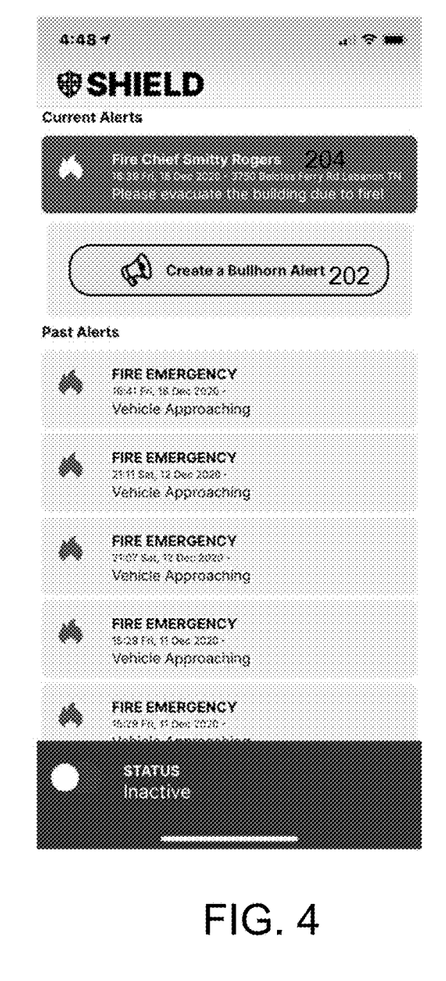
FIG. 4 shows an example of a bullhorn alert screen with inactive status.
Figure 5:
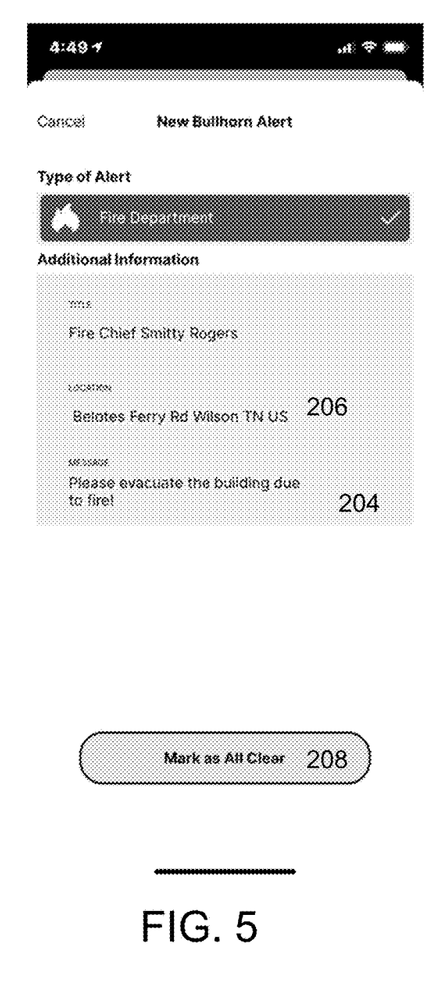
FIG. 5 shows an example of an alert creation screen.
Figure 6:
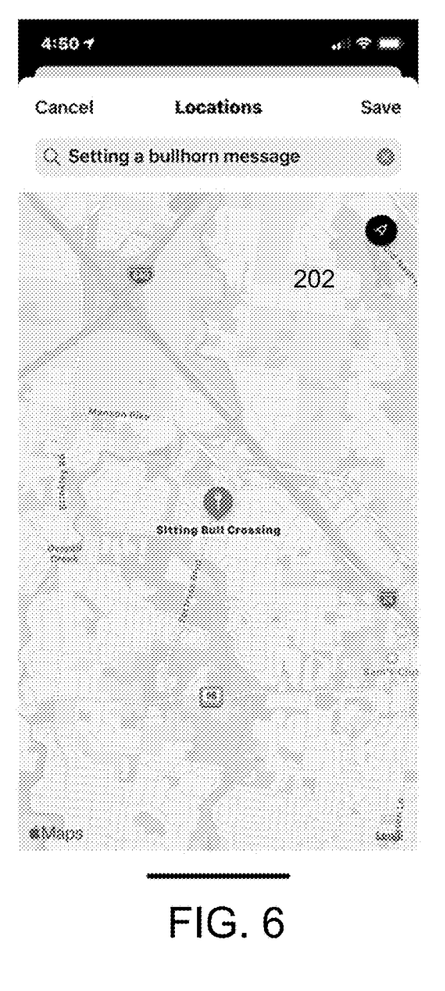
FIG. 6 shows an example of an alert location setting map screen.

In further embodiments, alerts and other emergency information, including instructions 112, can be sent from ES personnel 110 to civilian users of the system outside of the traveling ES vehicle context described above. For example, as seen in FIG. 2, the alert and emergency information 112 could be sent 140 to sub-sets of users for a variety of emergencies, such as, but not limited to, apartment or building fires 142, roadway accidents 144, gas leaks, jailbreaks or armed suspects on the loose 146, and localized missing child or Amber alerts 148 where time is of the essence. The ES personnel would use the first responder form of the application (as seen in FIGS. 3-6) to create 202 an appropriate alert and/or message 204, with or without instructions. The message and/or instructions 204, and the affected location 206, would then be transmitted to the system, and then to the appropriate sub-set of civilian users (e.g., all users within a certain distance of the location of the emergency event, all users in city block, all users in a building, all users at a particular address, and so on). The ES personnel could later send a message to clear the alert 208 when appropriate.

Figure 7:
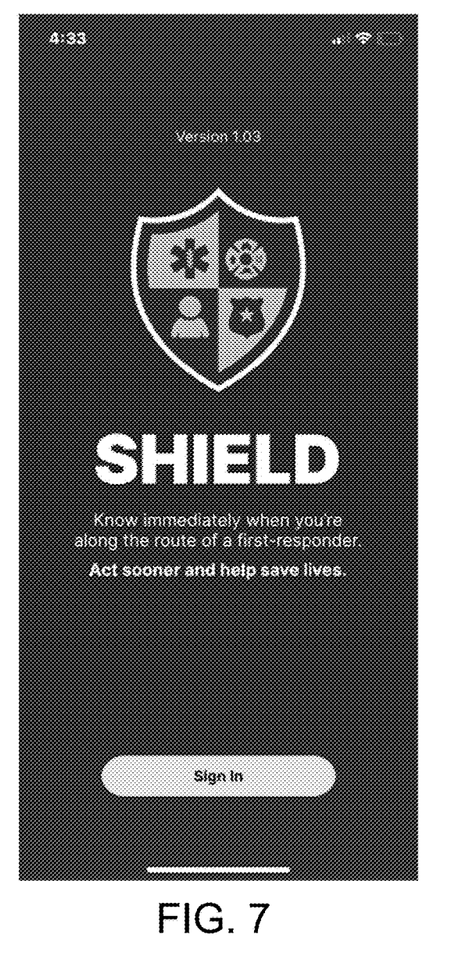
FIG. 7 shows an example of a start screen for a civilian user application.
Figure 8:
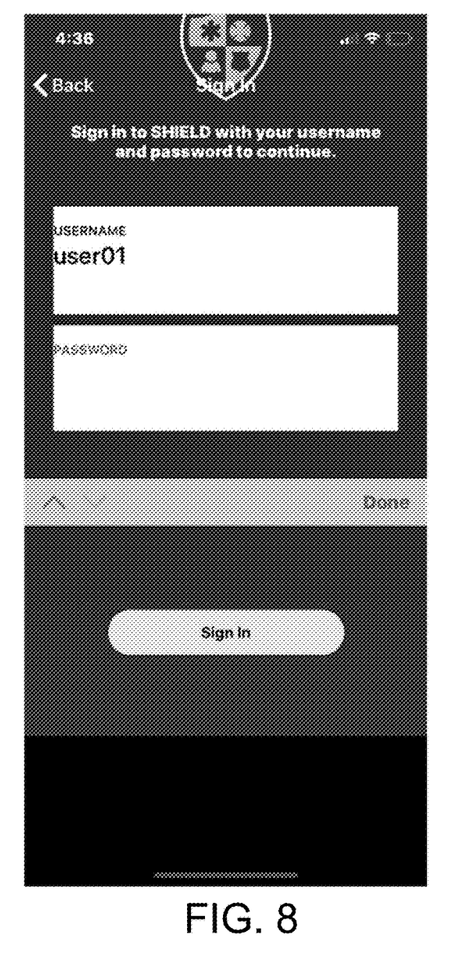
FIG. 8 shows an example of a sign-in screen.
Figure 9:
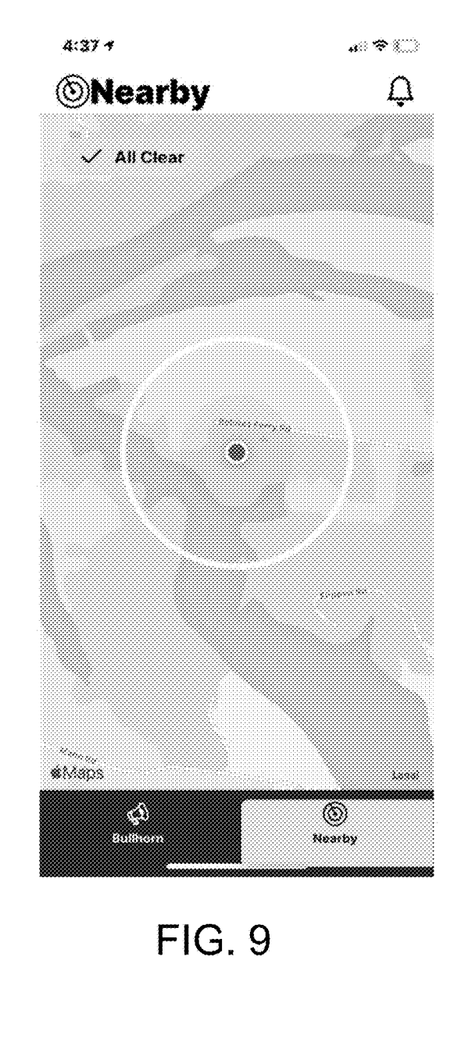
FIG. 9 shows an example of a nearby map screen.
Figure 10:
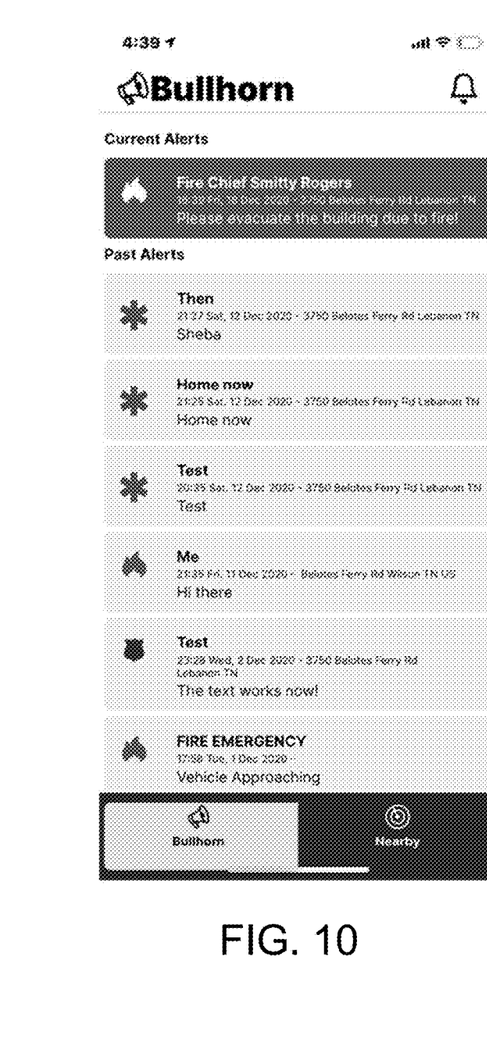
FIG. 10 shows an example of an alert screen.
Figure 11:
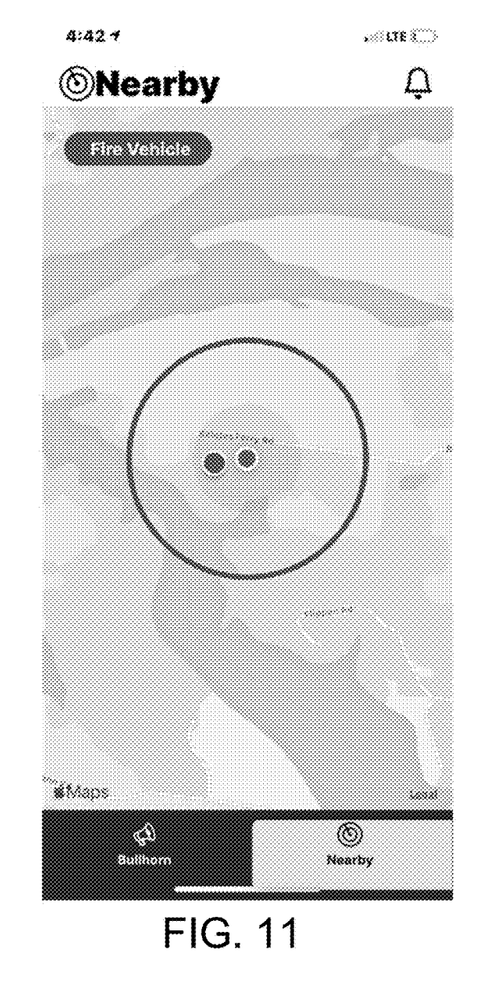
FIG. 11 shows an example of a nearby map screen with an active alert.

FIGS. 7-11 shows examples of a civilian user application being used to receive and display alert information and messages. FIG. 7 shows a login screen, FIG. 8 shows an example of a sign-in screen, FIG. 9 shows an example of a nearby map screen, FIG. 10 shows an example of an alert screen received by a civilian users, and FIG. 11 shows an example of a nearby map screen with an active alert.

While the above embodiments are discussed in the context of a system with central servers with remote computing devices, such as cell phones, tablets, or other mobile computing devices, in some embodiments the civilian user may be provided with an independent cellular receiving device containing the civilian application program. This would permit civilians who do not use smart phones or similar mobile computing devices to participate in the system. In additional embodiments, the communication is directly from the ES vehicle to the civilian users, such as, but not limited to, a radio signal sent to a receiving unit.

Accordingly, the present invention combines real-time app-based cellular technology with real-time GPS positioning to notify civilian drivers to allow them to respond to the presence of emergency vehicles in a much quicker fashion by notifying them with ample time to be on the lookout and to move out of the way of such vehicles. With this ease of implementation due to the installed mobile device app format, no additional receiving hardware issues will exist for most citizens. Unlike prior art systems, the present invention directly and selectively notify only drivers in a moving vehicle within a certain proximity to emergency vehicles when necessary. At the same time, the system selects out hundreds of other bystanders that need not be bothered with the emergency notification. All of this is under the direct control of the appropriate first responder, police officer, firefighter, or paramedic. The system thus offers an easily-integrated emergency response system designed to notify drivers from inside their own vehicles when an emergency vehicle is fast approaching, and also is able to send other additional customized warning signals to citizens in threatening situations.

Figure 12:
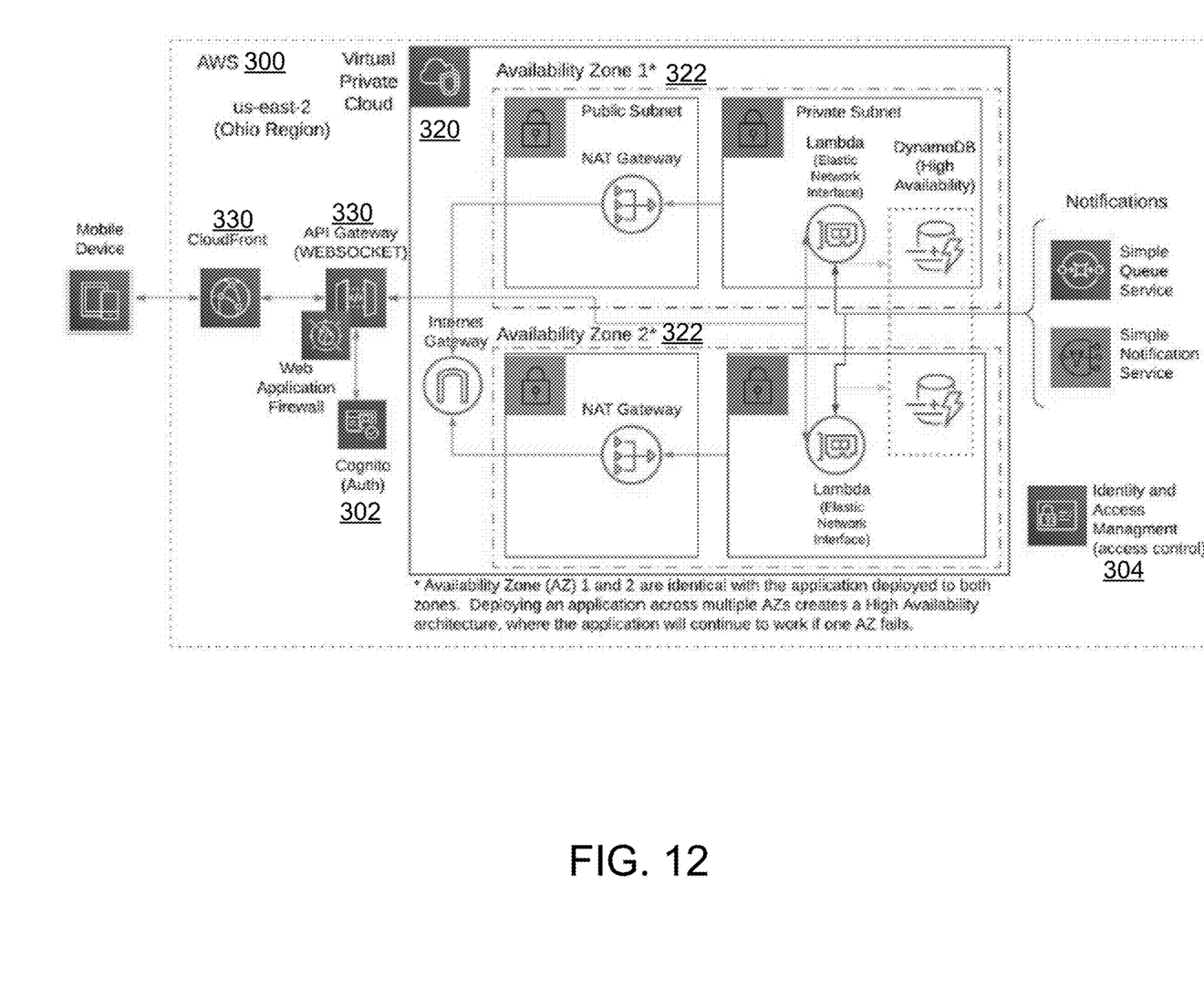
FIG. 12 shows a diagram of the AWS architecture for an embodiment of the present invention.

FIG. 12 shows a diagram of an AWS (Amazon Web Services) architecture 300 for an application in accordance with the present invention. The architecture ensures the security and scalability of the application, and ensures the protection of all personally identification (PII), particularly for the first-responder (FR) users.

The system authentication service 302, such as, but not limited to, Amazon Cognito, provides for authentication and storage of PII. The service should be a simple and secure user sign-in and access control service that can scale to millions of users. Storing all PII within the service inherits the service's comprehensive compliance controls, and reduces maintenance time and costs. The service should support multi-factor authentication (MFA) so that users are required to present two pieces of evidence for authentication: evidence (something only the user knows) and possession (something only the user has). MFA knowledge can be, for example, a user password. MFA possession can be, for example, a SMS text message to the user's phone or the use of a time-based one-time password (TOTP).

The authentication service uses encryption of data-at-rest as well as for data-in-transit. In an exemplary embodiment, all requests to the system's service must be made over Transport Layer Security (TLS) protocol, and support TLS 1.0 or later. The service may require clients to support cipher suites with perfect forward secrecy (PFS), such as, but not limited to, Ephemeral Diffie-Hellman (DHE), or Elliptical Curve Ephemeral Diffie-Hellman (ECDHE).

The system's Identity and Access Management (IAM) service 304 provides strong access control to the system's authentication service and other AWS services. IAM Users and Group are created to allow less privileged access for most system AWS users. Few system AWS users need full access to the authentication service, and the IAM service is used to control administrative user access to the authentication service. The IAM service allows fine-grained access control to each system and/or AWS service, and in one embodiment is configured to required MFA to access the system AWS Management Console and AWS Application Programming Interfaces (APIs). AWS best practices are followed for the AWS Root Account.

PII is stored only behind or in the authentication service database. Other user application information can be stored in a database with a user id field that corresponds to a user in the authentication service database. Non-PII application data is queried without the need to query PII information. The authentication service user pools provide a secure user directory that can scale to hundreds of millions of users. The directory includes standard attributes (e.g., address, email, name, phone number) as well as a number of custom attributes to store user information specifically required for the application (e.g., department, role).

The application is intended for use in multiple communities. In a typical scenario, a local organization enrolls to serve as a provider of emergency alerts and public service information. End users such as citizen and consumers (CR users) in the same geographic area can subscribe to that information. CR users are able to self-register by simply downloading a CR application to their computing device. In general, all CR users have (or can have) the same rights in the system (i.e., CR users can all see and do the same things). FR users, in contrast, are expected to and typically belong to one of the organizations that acts as a provider of emergency alerts and the public service and emergency event information and data described above, which in turn are provided to CR users. FR user rights are based on their membership in one of those organizations.

Accordingly, FR users belong to a multi-tenant system (or a multi-tenant part of the system), while CR users do not. The application architecture takes this complexity into account for FR users. In particular, it addresses authentication (i.e., who the FR user is, and how do they prove it) and authorization (i.e., what the FR user is allowed to see and do).

With regard to authentication, in one embodiment, the architecture assumes each FR user belongs to exactly one FR organization (in alternative embodiments, an FR user may belong to multiple FR organizations, so that a single FR user account has a combination of authentication processes and authorizations, or may have multiple FR user accounts, with each account tied to a particular FR organization, requiring the FR user to log into particular accounts to carry out different things, depending on their role at the time). The FR organization is the authority over who is and who is not a member. Although all FR users log into the same system application, there may be many real-world organizational units involved in determining appropriate access to the system. Access patterns include, but are not limited to, the following:

Federated: In a federated model, FR Organizations act as the direct identity providers for their FR Users. Network services allow outside systems to authenticate users on-demand using standard protocols (such as LDAP and SAML).

Centralized: In a centralized model, the system itself is responsible for managing, authenticating, and authorizing all users. This approach is simpler to implement and maintain in the sense that it does not require coordination with other groups in order to configure and test. In addition, having a single access protocol simplifies operation and design of the application Hybrid: In a hybrid model, organizations can choose to act as identity providers but can also opt for the system's identity management services instead.

The architecture shown supports all three models. While any of the above access models can be used, in one embodiment the system primarily uses centralized access, with a pathway to a hybrid system if needed. If an FR organization wishes to retain direct control over user management services, the system can be adapted to this usage without a fundamental change in architecture.

Authorization concerns what users are allowed to do and, more particularly, what they are not allowed to do within the system. In the present application, a multi-tenant application, the tenant entities (i.e., FR organizations) serve as "scopes" of their users' authority. In this arrangement, each tenant can "own" certain entities in the domain. The system enforces rules that may restrict access to entities based on their ownership, creating the notion of a private or controlled area. Some parts of the application domain are global, meaning that they are shared across organizations. In the present application, this includes the ability to read information posted for public use, which effectively anyone can do. That is, CR users can read this information, and anyone can register as a CR user.

Restrictions arise in two cases. The first is writing public information associated with an organization. When an organization publishes information, it is identified as the authority behind that information. The present system acts as an intermediary between organizations and CR users, but it does not present itself as the originator of the messages. When presenting emergency alerts in particular, identifying the provenance of the message is critical to maintaining trust in the system. As such, it is critical that the system ensures each organization's exclusive access to write records that will be associated with its name.

The second is reading or writing private information associated with an organization. Organizations may wish to manage some information in the system that is not intended for any outside readers. For example, an FR organization may want to support the creation of alert messages that are intended only for its staff members. Such alerts would be neither readable nor writable to users outside of the organization. In some embodiments, the present system includes such capabilities supported by the same underlying permissions model described herein. Scalability and High Availability (HA) are core attributes of the system's architecture. The scalability of the architecture is based on utilizing fully managed services that are designed to scale based on demand at an enterprise level. These fully managed services also provide HA to maximize the uptime of the infrastructure. HA is used to describe a system that is fault-tolerant, highly dependable, and operates without a single point of failure. In several embodiments, the system runs code without provisioning or managing servers (i.e., using a serverless compute service).

The system also uses AWS Regions 320, which are large and widely dispersed into separate geographic locations. Each Region has multiple, isolated locations known as Availability Zones (AZs) 322. AZs are isolated from failure of other AZs within a Region. In several embodiments, applications are deployed across multiple AZs to ensure if one AZ has a failure that the application continues to function.

The API Gateway 330 handles all the tasks involved in accepting and processing up to hundreds of thousands of concurrent API calls, including traffic management, CORS support, authorization and access control, throttling, monitoring, and API version management. It provides end users with the lowest possible latency for API requests and responses by taking advantage of AWS's global network of edge locations using Amazon CloudFront 340. API Gateway WebSocket API provides real-time two-way communication with a persistent connection to handle message transfer between the system application and end users.

In order to provide a context for the various computer-implemented aspects of the invention, the following discussion provides a brief, general description of a suitable computing environment in which the various aspects of the present invention may be implemented. A computing system environment is one example of a suitable computing environment, but is not intended to suggest any limitation as to the scope of use or functionality of the invention. A computing environment may contain any one or combination of components discussed below, and may contain additional components, or some of the illustrated components may be absent. Various embodiments of the invention are operational with numerous general purpose or special purpose computing systems, environments or configurations. Examples of computing systems, environments, or configurations that may be suitable for use with various embodiments of the invention include, but are not limited to, personal computers, laptop computers, computer servers, computer notebooks, hand-held devices, mobile computing devices, microprocessor-based systems, multiprocessor systems, TV set-top boxes and devices, programmable consumer electronics, cell phones, personal digital assistants (PDAs), tablets, smart phones, mobile phones, modular phones, touch screen devices, smart TV, TVs, internet-enabled appliances, internet-enabled security systems, internet-enabled gaming systems, internet-enabled watches; internet-enabled cars (or transportation), network PCs, mini-computers, mainframe computers, embedded systems, virtual systems, distributed computing environments, streaming environments, volatile environments, and the like.

Embodiments of the invention may be implemented in the form of computer-executable instructions, such as program code or program modules, being executed by a computer, virtual computer, or computing device. Program code or modules may include programs, objects, components, data elements and structures, routines, subroutines, functions and the like. These are used to perform or implement particular tasks or functions. Embodiments of the invention also may be implemented in distributed computing environments. In such environments, tasks are performed by remote processing devices (e.g., "cloud computing") linked via a communications network or other data transmission medium, and data and program code or modules may be located in both local and remote computer storage media including memory storage devices such as, but not limited to, hard drives, solid state drives (SSD), flash drives, USB drives, optical drives, and internet-based storage (e.g., "cloud" storage).

In one embodiment, a computer system or computing system environment comprises multiple client devices in communication with one or more server devices through or over a network, although in some cases no server device is used. In various embodiments, the network may comprise the Internet, an intranet, Wide Area Network (WAN), or Local Area Network (LAN). It should be noted that many of the methods of the present invention are operable within a single computing device.

A client device may be any type of processor-based platform that is connected to a network and that interacts with one or more application programs. A client device may comprise a computer-readable medium in the form of volatile and/or nonvolatile memory such as read only memory (ROM) and random access memory (RAM) in communication with a processor. The processor executes computer-executable program instructions stored in memory. Examples of such processors include, but are not limited to, microprocessors, ASICs, and the like.

Client devices may further comprise computer-readable media in communication with the processor, said media storing program code, modules and instructions that, when executed by the processor, cause the processor to execute the program and perform the steps described herein. Computer readable media can be any available media that can be accessed by computer or computing device and includes both volatile and nonvolatile media, and removable and non-removable media. Computer-readable media may further comprise computer storage media and communication media. Computer storage media comprises media for storage of information, such as computer readable instructions, data, data structures, or program code or modules. Examples of computer-readable media include, but are not limited to, any electronic, optical, magnetic, or other storage or transmission device, a floppy disk, hard disk drive, CD-ROM, DVD, magnetic disk, memory chip, ROM, RAM, EEPROM, flash memory or other memory technology, an ASIC, a configured processor, CD-ROM, DVD or other optical disk storage, magnetic cassettes, magnetic tape, magnetic disk storage or other magnetic storage devices, or any other medium from which a computer processor can read instructions or that can store desired information. Communication media comprises media that may transmit or carry instructions to a computer, including, but not limited to, a router, private or public network, wired network, direct wired connection, wireless network, other wireless media (such as acoustic, RF, infrared, or the like) or other transmission device or channel. This may include computer readable instructions, data structures, program modules or other data in a modulated data signal such as a carrier wave or other transport mechanism. Said transmission may be wired, wireless, or both. Combinations of any of the above should also be included within the scope of computer readable media. The instructions may comprise code from any computer-programming language, including, for example, C, C++, C#, Visual Basic, Java, and the like.

Components of a general purpose client or computing device may further include a system bus that connects various system components, including the memory and processor. A system bus may be any of several types of bus structures, including, but not limited to, a memory bus or memory controller, a peripheral bus, and a local bus using any of a variety of bus architectures. Such architectures include, but are not limited to, Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computing and client devices also may include a basic input/output system (BIOS), which contains the basic routines that help to transfer information between elements within a computer, such as during start-up. BIOS typically is stored in ROM. In contrast, RAM typically contains data or program code or modules that are accessible to or presently being operated on by processor, such as, but not limited to, the operating system, application program, and data. Client devices also may comprise a variety of other internal or external components, such as a monitor or display, a keyboard, a mouse, a trackball, a pointing device, touch pad, microphone, joystick, satellite dish, scanner, a disk drive, a CD-ROM or DVD drive, or other input or output devices. These and other devices are typically connected to the processor through a user input interface coupled to the system bus, but may be connected by other interface and bus structures, such as a parallel port, serial port, game port or a universal serial bus (USB). A monitor or other type of display device is typically connected to the system bus via a video interface. In addition to the monitor, client devices may also include other peripheral output devices such as speakers and printer, which may be connected through an output peripheral interface.

Client devices may operate on any operating system capable of supporting an application of the type disclosed herein. Client devices also may support a browser or browser-enabled application. Examples of client devices include, but are not limited to, personal computers, laptop computers, mobile computing devices, personal digital assistants, computer notebooks, hand-held devices, cellular phones, mobile phones, modular phones, smart phones, pagers, digital tablets, Internet appliances, and other processor-based devices. Users may communicate with each other, and with other systems, networks, and devices, over the network through the respective client devices.

Thus, it should be understood that the embodiments and examples described herein have been chosen and described in order to best illustrate the principles of the invention and its practical applications to thereby enable one of ordinary skill in the art to best utilize the invention in various embodiments and with various modifications as are suited for particular uses contemplated. Even though specific embodiments of this invention have been described, they are not to be taken as exhaustive. There are several variations that will be apparent to those skilled in the art.

What is claimed is:

1. A method for identifying the presence of an emergency vehicle, comprising the steps of:
providing a central server in electronic communication with a network, said central server comprising one or more microprocessors or processors operatively coupled to a memory;
receiving, at a first time, from an emergency response device in electronic communication with the network, an emergency status signal indicating that an emergency exists;
determining the location of the emergency response device at said first time;
determining, from a plurality of civilian mobile computing devices in electronic communication with said network, a sub-set of said plurality of civilian mobile computing devices that are located within a pre-determined distance of the location of the emergency response device at said first time;
automatically generating an alert message related to the emergency response device;
automatically transmitting, over the network, the alert message to the sub-set of said plurality of civilian mobile computing devices in real time, thereby alerting users of said plurality of civilian mobile computing devices of the presence of an emergency response vehicle within the pre-determined distance;
while the emergency continues to exist:
  determining an updated location of the emergency response device at a subsequent time;
  automatically updating the sub-set of said plurality of civilian mobile computing devices that are located within a pre-determined distance of the updated location of the emergency response device;
  automatically transmitting, over the network, the alert message to the updated sub-set of said plurality of civilian mobile computing devices in real time;
  receiving, over the network, a signal indicating that the emergency has been resolved;
  automatically generating an alert resolution message indicating that the emergency has been resolved; and
  automatically transmitting, over the network, the alert resolution message to the most recent updated sub-set of said plurality of civilian mobile computing devices in real time.

2. The method of claim 1, wherein the emergency response device is located in an emergency response vehicle.

3. The method of claim 1, wherein the sub-set of said plurality of civilian mobile computing devices is limited to civilian mobile computing devices that are in a vehicle or that are travelling above a pre-set speed.

4. The method of claim 1, wherein the sub-set of said plurality of civilian mobile computing devices excludes civilian mobile computing devices located in a house, office, or building.

5. The method of claim 1, wherein the alert message comprises an audible alert providing information about the emergency vehicle, said information comprising direction of travel of the emergency vehicle, speed of the emergency vehicle, and the type of emergency vehicle.

6. The method of claim 1, wherein the alert message is audible.

7. The method of claim 1, further comprising the steps of:
  receiving, over the network, emergency event instructions in text form from the emergency response device;
  automatically transmitting, over the network, the emergency event instructions in text form to the updated sub-set of said plurality of civilian mobile computing devices in real time.

* * * * *